A. J. WOOD.
TRUCK.
APPLICATION FILED FEB. 24, 1920.

1,392,387.  Patented Oct. 4, 1921.

Inventor
A. J. Wood
By Frank E. Liverance, Jr.
Attorney

UNITED STATES PATENT OFFICE.

A J WOOD, OF GRAND RAPIDS, MICHIGAN, ASSIGNOR TO BENNETT INJECTOR COMPANY, OF MUSKEGON, MICHIGAN, A CORPORATION OF DELAWARE.

TRUCK.

1,392,387.　　　　　Specification of Letters Patent.　　Patented Oct. 4, 1921.

Application filed February 24, 1920. Serial No. 360,865.

*To all whom it may concern:*

Be it known that I, A J WOOD, a citizen of the United States of America, residing at Grand Rapids, in the county of Kent and State of Michigan, have invented certain new and useful Improvements in Trucks; and I do hereby declare the following to be a full, clear, and exact description of the invention, such as will enable others skilled in the art to which it appertains to make and use the same.

This invention relates to a truck, particularly adapted to carry containers such as barrels, casks or the like, filled with lubricating grease. The truck, of course, is adapted to carry and transport containers of this character irrespective of what is in the container. Barrels and casks containing grease, paint or the like are very heavy and a truck to handle the same must not only operate easily but must be very strong and durable in order to withstand the hard usage and the strains to which they are subjected in service. Such trucks also should be of very simple construction, readily manufactured at low cost. It is an object and purpose of the present invention to provide a truck which attains these ends in all respects, the truck produced being very simple in construction and extremely durable and efficient in use and operation.

For an understanding of the invention reference may be had to the following description taken in conjunction with the accompanying drawing, in which.

Like reference characters refer to like parts in the different views of the drawing.

Figure 1:
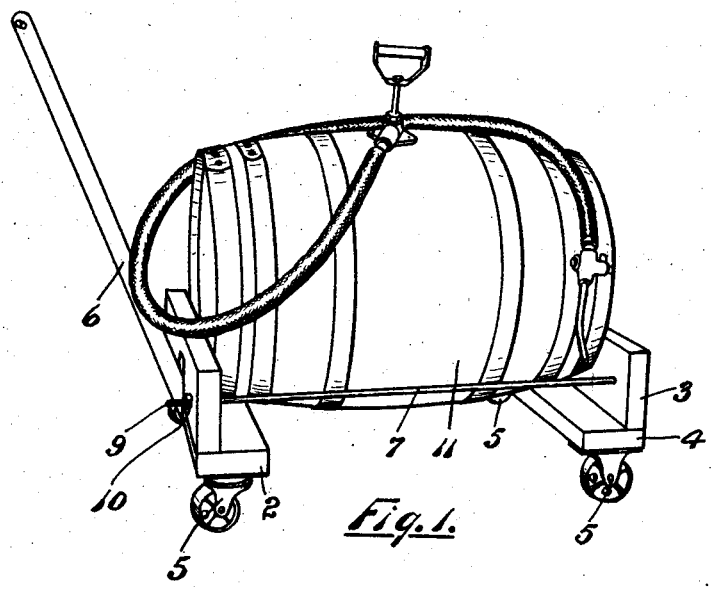
Figure 1 is a perspective view of the truck, the same being shown as handling a barrel of lubricating grease.
Figure 2:
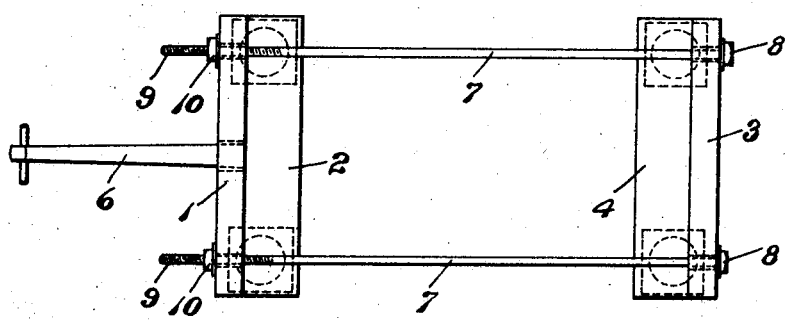
Fig. 2 is a plan view of the truck.

In construction, a front truck member is provided, comprising a vertical relatively strong and heavy member 1 of wood, to which in the construction shown in Figs. 1 and 2, a lower horizontal ledge 2 of wood is permanently secured, the same extending back of the member 1. The truck also includes a rear truck member of substantially the same construction including an upright or vertical member 3, substantially identical with member 1, and a lower horizontal forwardly projecting ledge 4 which is permanently secured to the under side of said member 3. At each end of each of these truck members rollers or casters 5 are secured. From the front truck member a tongue 6 extends upwardly and forwardly being permanently secured at its lower end to the vertical part 1 of the front truck member.

The front and rear truck members are connected by two parallel spaced apart rods 7 which pass loosely through the upright members 1 and 3 of the rear and front truck members, said rods at their rear ends being provided with heads 8 which bear against the rear side of the part 3 of the rear truck member. At their front ends these rods 7 are threaded, as indicated at 9, to receive nuts 10 as shown. It, of course, is apparent that the rear ends of the rods 7 may be likewise threaded and nuts 10 used instead of the heads 8, this being a matter merely of design and not changing the action of the truck in any respect.

When the barrel or other container 11 is to be placed on the truck the nuts 10 are loosened so that there is plenty of space for the barrel to pass between the upright parts 1 and 3 of the two truck members, the ends of the barrel resting on the horizontal ledges 2 and 4. The nuts 10 are then tightened so as to bring the heads of the barrel or similar container against said upright portions 1 and 3 of the two truck members. In a very short time a depression is made on the rear side of the member 1 and on the front side of the member 3, due to the pressure of the ends of the barrel against said members so that practically the entire weight of the container is taken by the vertical members 1 and 3 after the nuts 10 are tightened. From this it follows that the rods 7 are subject only to a tension strain and the container itself serves to give rigidity to the truck while it is in use. This truck may be moved to different positions and carried from one place to another, for instance, in a garage for the dispensing of grease from the container 11 which dispensing may be obtained in any desired manner though I have shown the container equipped with the grease gun which forms the subject matter of my application for Patent Ser. No. 360,864, filed Feb. 24, 1920.

Figure 3:
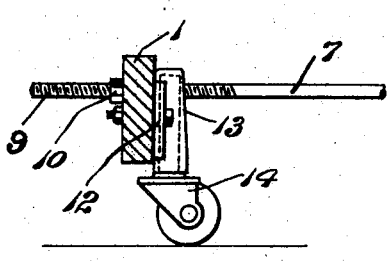
Fig. 3 is a fragmentary side elevation of one end of a slightly modified form of construction of truck.

In Fig. 3, a slight modification in construction is shown. The horizontal ledges 2 and 4 are eliminated and at each end of the vertical members of the truck, brackets 12 are secured each being provided with a socket 13 to receive the vertical spindle of a caster 14. In practice, it may be desirable to provide the vertical members 1 and 3 of the truck with some horizontally extending device between the ends thereof to serve as a ledge on which the ends of the barrel may rest until nuts 10 are tightened to hold the barrel between the upright parts 1 and 3, but the full length ledge made by parts 2 and 4 is not needed.

The truck is very simple in construction. It is very effective and durable in service. The heavy weights which must be carried in moving a barrel of grease from one place to another, in many instances over uneven floors, requires that the truck shall be of exceptional strength. The front and rear truck members may be made amply strong to sustain the weights which are carried by the truck while, as rods 7 are subjected only to tension strains, such rods may be made amply strong without the use of any considerable amount either in weight or bulk of material.

I claim:

1. A truck comprising front and rear truck members each including a vertical part, rods passing loosely through said vertical parts of the truck members and located in spaced apart relation to each other, and means on said rods for drawing said truck members toward each other and against a barrel or other container held between them, substantially as described.

2. A truck including front and rear truck members, each including a vertical part between which a barrel or similar container is adapted to be placed, a rod passing loosely through the vertical parts of the truck members so as to be located one at each side of the container, and nuts threaded onto the ends of the rods for binding said vertical parts of the truck members against the ends of the container, substantially as and for the purposes described.

3. A truck comprising front and rear truck members, each truck member including a vertical part, and a ledge at its lower edge, the ledge of the front truck member extending rearwardly and of the rear member extending forwardly, a pair of rods passing loosely through the vertical portions of said truck members and disposed in spaced apart relation, and means on the rods for drawing the truck members toward each other and against the ends of a container disposed between them, substantially as and for the purposes described.

4. In a truck, a front truck member including a vertically positioned member of wood, a ledge attached to and extending back of said vertical member at the lower part thereof, a rear truck member including a similar vertical member of wood, a ledge connected thereto and extending forwardly from the lower portion thereof, casters attached one at each end of each truck member, rods passing loosely through the truck members and disposed in spaced apart relation, and means on the rods for drawing the truck members toward each other and against a barrel or similar container disposed between them, substantially as described.

5. A truck comprising front and rear truck members adapted to receive and carry the ends of a barrel or similar container, and means connected to the truck members for drawing the same toward each other and against the ends of the container, substantially as and for the purposes described.

In testimony whereof I affix my signature.

A. J. WOOD.